United States Patent [19]

Garcia

[11] 3,875,527

[45] Apr. 1, 1975

[54] ENVIRONMENTAL PARAMETER CONTROLLED OSCILLATOR SYSTEM

[76] Inventor: Hernando Javier Garcia, 122 Eureka St., San Francisco, Calif. 94114

[22] Filed: July 11, 1973

[21] Appl. No.: 378,267

[52] U.S. Cl. ............... 331/66, 315/158, 331/108 D, 331/111, 331/113 R, 331/135, 331/143, 340/227 R, 340/228 R

[51] Int. Cl. ......................... H03k 3/35, H05b 37/02

[58] Field of Search ........... 331/65, 66, 108 D, 111, 331/113 R, 135, 136, 143; 315/149, 156, 158, 159; 340/81 R, 228 R, 228 S, 227 R

[56] References Cited

UNITED STATES PATENTS

| | | | |
|---|---|---|---|
| 3,377,507 | 4/1968 | Riebs | 315/149 X |
| 3,573,776 | 4/1971 | Dick et al. | 331/66 X |

OTHER PUBLICATIONS

Dean et al., RCA Application Note ICA-6267 "Digital Integrated Circuits," pp. 353–360, March 1971.

*Primary Examiner*—Siegfried H. Grimm
*Attorney, Agent, or Firm*—Criddle & Thorpe

[57] ABSTRACT

Disclosed is an oscillator system whose output pulse rate is controlled by some environmental parameter such as light or temperature. In one embodiment of the system, the output of a first inverter is connected to one input of a NOR gate whose output is connected to the input of a second inverter. The output of the NOR gate is also connected via a capacitor to the input and output of the first inverter. The output of the second inverter is connected via a sensing device to a second input of the NOR gate. The resistance of the sensing device varies as a function of the environmental parameter sensed to cause the NOR gate either to generate a sequence of output pulses or to generate no output signal.

4 Claims, 8 Drawing Figures

ENVIRONMENTAL PARAMETER CONTROLLED OSCILLATOR SYSTEM

BACKGROUND OF THE INVENTION

This invention relates to oscillators and more particularly to an oscillator system whose output is a function of the value of some environmental parameter such as temperature, amount of light or the like.

One well-known use of oscillators is for controlling the activation of warning lamps such as those used in road construction to warn motorists of road construction obstacles. In this particular use, it may be desirable that the oscillator be designed to generate an output during darkness but not during daylight hours so that the lamp is caused to flash only during darkness. This mode of operation would preserve during daylight hours the battery which is used to activate the oscillator and lamp. On the other hand, it may be desirable that the lamp be controlled to flash during daylight hours to provide some warning, but that the flash rate be less than that during darkness to again conserve battery energy. The slower daylight flash rate also allows for quick daytime inspection of the lamps to determine if they are functioning properly.

In either of the above situations, it is desirable that battery drain caused by the oscillator circuitry, apart from the lamp, be minimized.

SUMMARY OF THE INVENTION

It is an object of the present invention to provide a simple, inexpensive and reliable oscillator whose output frequency is controlled by some environmental parameter.

This and other objects of the present invention are realized in a specific illustrative embodiment which includes a first inverter and a logic gate having first and second input terminals and an output terminal, with the first input terminal being coupled to the output of the first inverter. The logic gate generates a first signal when a second signal is applied to both input terminals thereof and generates the second signal when the first signal is applied to either or both of the input terminals thereof. Also included is a second inverter whose input is coupled to the output terminal of the logic gate, a sensing means coupled between the output of the second inverter and the second input terminal of the logic gate, and a feedback circuit coupling the output terminal of the logic gate with both the input and output of the first inverter. The sensing means is adapted to vary its resistance as a function of some environmental parameter such as light, temperature, etc. to thereby vary the signal level applied to the second input terminal of the logic gate. Appropriate variation of this signal level controls whether or not the logic gate generates a pulsed output.

BRIEF DESCRIPTION OF THE DRAWINGS

A complete understanding of the present invention and of the advantages thereof may be gained from a consideration of the following detailed description of illustrative embodiments presented in connection with the accompanying drawings in which.

DETAILED DESCRIPTION

Figure 1:
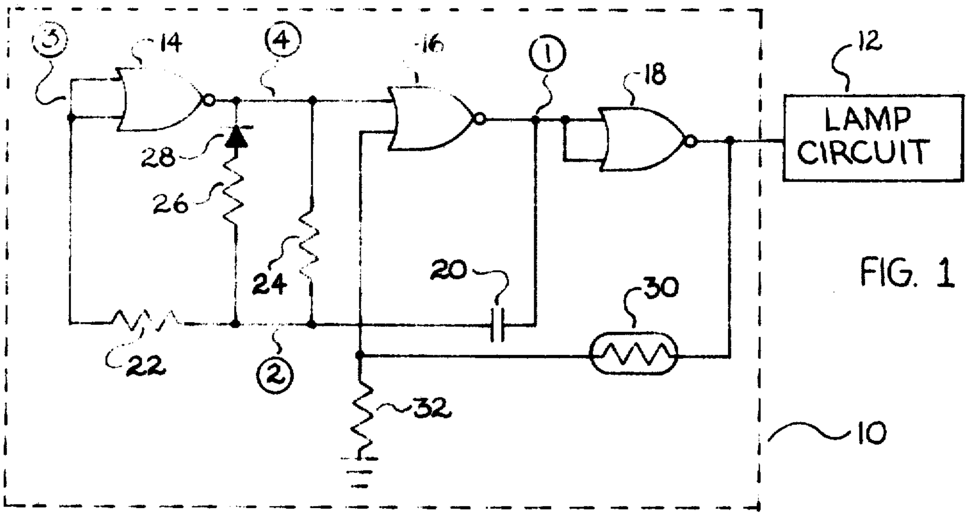
FIG. 1 shows an environmental parameter responsive oscillator made in accordance with the principles of the present invention using NOR logic gates.
Figure 4:
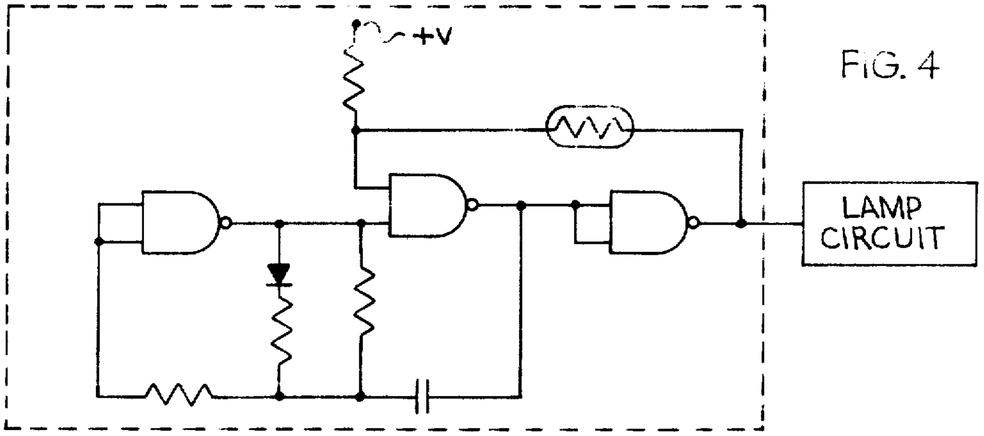
FIG. 4 is an illustrative embodiment of an environmental parameter responsive oscillator made in accordance with the principles of the present invention utilizing NAND logic gates.

FIGS. 1 and 4 show embodiments of oscillators in which output pulses are either generated or not generated depending upon the condition of some environmental parameter to be sensed. That is, when the value of the environmental parameter is on one side of a threshold level (e.g. below the threshold level) then the oscillators of FIG. 1 and 4 will be caused to generate output pulses of a predetermined frequency whereas if the value of the parameter is on the other side of the threshold level (e.g. above the threshold level), then no output pulses will be generated.

Referring now to FIG. 1, there is shown an oscillator 10 coupled to a lamp circuit 12. The oscillator circuit 10 includes a NOR gate "inverter" 14 whose output is coupled to one input of a NOR gate 16. The output of NOR gate 16 is coupled by way of a feedback circuit to both inputs of the inverter 14 and to the output thereof and thus necessarily to one input of the NOR gate 16. The feedback circuit includes a capacitor 20 coupled in series with a resistor 22 to the inputs of the inverter 14. The junction between the resistor 22 and capacitor 20 is coupled by way of a resistor 24 and the series connection of a resistor 26 and a diode 28 to the output of the inverter 14. The output of the NOR gate 16 is also connected to both inputs of a NOR gate inverter 18. The output of the inverter 18 is coupled via a sensing device 30 to the other input of the NOR gate 16. A resistor 32 couples the junction between the sensing device 30 and the lower input terminal of the NOR gate 16 to ground potential. The output of the inverter 18 is supplied to the lamp circuit 12.

The NOR gate 16 and NOR gate inverters 14 and 18 could illustratively be constructed of complementary MOS logic. The NOR and NAND gates and inverters of the other embodiments to be discussed could also be constructed of complementary MOS logic.

Figure 2:
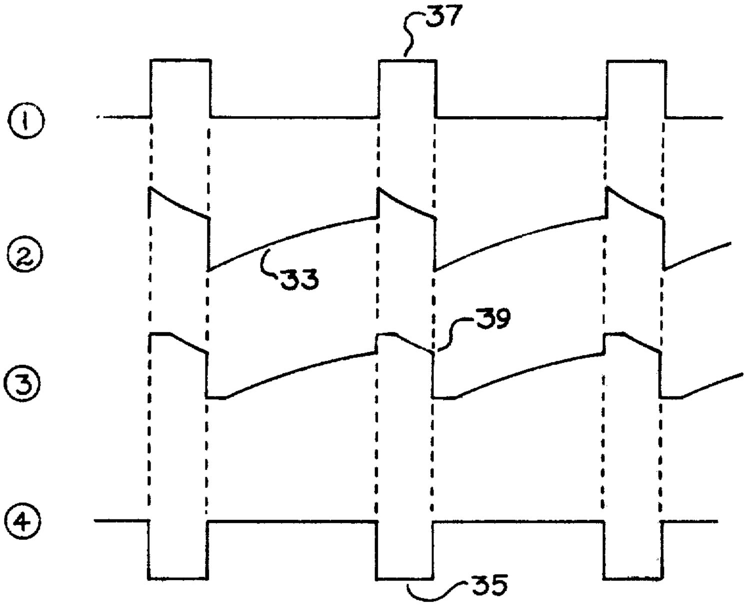
FIG. 2 is a diagrammatic illustration of signal waveforms generated at various points in the FIG. 1 circuit.

The operation of the FIG. 1 circuit will be explained by reference to FIG. 2 which shows the waveforms of signals generated at points 1, 2, 3 and 4 of the circuit (when the circuit is generating an output). Assume first that the environmental parameter to be sensed by the sensing device 30 is the light level and that the resistance of the sensing device 30 decreases as the light impinging thereon increases (standard photocell) so that the oscillator circuit 10 does not oscillate when the light level is above a certain threshold level. When the light level is above the threshold level so that the resistance of the photocell 30 is below a corresponding threshold level, a high or binary "one" signal appearing at the output of the inverter 18 will inhibit the oscillator circuit 10 from further generating an oscillatory output. This high signal is fed back via the photocell 30 to one input by the NOR gate 16 causing the output of the NOR gate 16 to be low or a binary "zero". This low output, in turn, causes the inverter 18 to continue generating a high output. Until the resistance of the photocell 30 increases (due to the decrease in the light level) to the point where the voltage drop thereacross is sufficient to present a low signal to the input of the NOR gate 16 (i.e. until the photocell 30 impedes the high signal output of inverter 18 to the point where it appears as a low signal to the NOR gate 16), the high output signal from inverter 18 will be maintained.

Figure 3A:
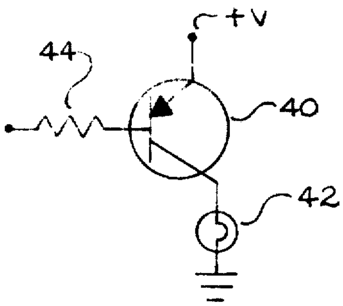
FIGS. 3A and 3B show illustrative embodiments of the lamp circuit of FIG. 1.
Figure 3B:
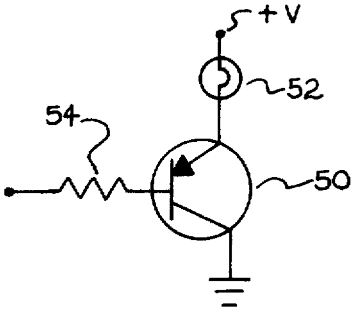

A high output signal signal from inverter 18 causes the lamp circuit 12 to remain turned off. Illustrative embodiments of the lamp circuit 12 are shown in FIGS. 3A and 3B. The circuit of FIG. 3A includes a PNP type transistor 40 whose emitter-collector circuit is connected in series with a lamp 42. Specifically, the emitter of the transistor 40 is coupled to a positive voltage source (battery) and the collector of the transistor is coupled via the lamp 42 to ground potential. The base of the transistor 40 is coupled via a resistor 44 to the output of the inverter 18. When the output of the inverter is high, the transistor 40 is biased in the OFF condition so that no current is applied from the positive voltage source via the transistor 40 to the lamp and the lamp emits no light.

The circuit of FIG. 3B also includes a PNP type transistor 50 whose emitter-collector circuit is connected in series with a lamp 52. In this circuit, the emitter of the transistor 50 is connected via the lamp 52 to a positive voltage source (battery) and the collector of the transistor is connected to ground potential. With this configuration, current applied to the transistor 50 to turn the transistor on would also be supplied to the lamp 52 to assist in turning on the lamp whereas with the configuration of FIG. 3A, the current supplied to the transistor 40 to turn on the transistor would not be supplied to the lamp. Otherwise the operation of the FIG. 3B circuit is the same as that of the circuit of FIG. 3A.

Returning to the description of FIG. 1, assume that the light level falls below the threshold level referred to earlier, i.e., the threshold level at which the resistance of the photocell 30 increases to the point where a high signal output from the inverter 18 will appear as a low signal input to the NOR gate 16. Under this condition, when the output of the NOR gate 16 is low, the capacitor 20 is initially charged negative (or low). This is shown in waveforms 1 and 2 of FIG. 2. As a result of this low charge on the capacitor 20, a low signal is presented to the inverter 14 causing it to generate a high output signal as indicated by waveform 4 of FIG. 2. The resistor 24 provides a path from the output of the inverter 14 to the capacitor 20 to enable charging the capacitor positive (or high) as indicated by portion 33 of waveform 2 of FIG. 2. As the voltage on the capacitor 20 approaches and passes through the transfer voltage point of the inverter 14 (the point at which the inverter 14 changes states), the output of the inverter 14 becomes low. The low output from inverter 14 together with the low input from the photocell 30 cause the NOR gate 16 to generate a high output which, in turn, causes the inverter 18 to generate a low output. The change of state of the inverter 14 and NOR gate 16 are shown by portions 35 and 37 of the waveforms 4 and 1 respectively of FIG. 2. The low output of the inverter 18 is applied to the lamp circuit 12 to cause the lamp circuit to turn on. This is evident from an examination of FIGS. 3A and 3B in which it is clear that the application of a low signal to the base of the transistors 40 or 50 would cause the transistors to turn on and apply current from the voltage source to the lamps 42 or 52.

In addition to the resistance 24, an additional discharge path for the capacitor 20 is provided by the resistor 26 and diode 28. Thus, the positive charge on the capacitor 20 discharges at a faster rate than it is charged so that the capacitor 20 is discharged at a faster rate than it was charged and the voltage at point 3 of the circuit approaches and passes through the transfer voltage point of the inverter 14 more rapidly than during the charging cycle of capacitor 20. When the transfer voltage point of the inverter 14 is passed (indicated at 39 of waveform 3 of FIG. 2) the output of the inverter 14 becomes high causing the output of NOR gate 16 to become low and the output of inverter 18 to again become high. The lamp circuit 12 is then turned off and the capacitor 20 is initially charged negative and then commences to charge positive as previously described and the cycle repeates. This oscillatory operation of inverter 14 and NOR gate 16 is described in the RCA publication "Digital Integrated Circuits", Application Note ICAN-6267 in an article entitled "Astable and Monostable Oscillators Using RCA COS/MOS Digital Integrated Circuits" by J. A. Dean and J. P. Rupley.

The duty cycle of the oscillator 10 of FIG, 1, i.e., the ratio of the time a low output is generated to the time a high output is generated, can be varied by varying the resistance of the resistor 26. Thus, decreasing the resistance of the resistor 26 would shorten the discharge time for the capacitor 20 and thus result in the oscillator 10 generating a low output for a shorter period of time in each cycle. Conversely, increasing the resistance of the resistor 26 would result in the oscillator 10 generating a low output during a greater period of time of a cycle. The value of the resistance of resistor 24 similarly controls the charge rate of the capacitor 20. Variable resistors could be provided for resistors 24 and 26 to provide manual control of the output pulse rate of the oscillator 10.

The circuit of FIG. 1 provides a simple, reliable and efficient light responsive oscillator for driving a lamp circuit 12. The leakage currents in circuitry are very small thus minimizing battery drain. When the ligh light level is above a certain threshold (daytime), the output signal supplied by the oscillator 10 prevents the lamp circuit from turning on. When the light level is below the threshold (nighttime), the oscillator 10 provides an oscillatory signal to cause the lamp circuit 12 to flash. Of course, the photocell 30 could be replaced by another environmental sensing device such as a thermistor for controlling the oscillator output in accordance with a change in temperature rather than a change in lighting.

FIG. 4 shows an alternative embodiment for an environmental parameter responsive oscillator system in accordance with the present invention and utilizing NAND logic rather than NOR logic. The operation of the FIG. 4 circuit is essentially the same as that of FIG. 1 except that log signals are generated in FIG. 4 at each point of the circuit where high signals were generated in FIG. 1 and vice versa. The lamp circuit of FIG. 4 could be similar to those of FIGS. 3A and 3B except that NPN type transistors would be utilized in place of the PNP type transistors.

Figure 5:
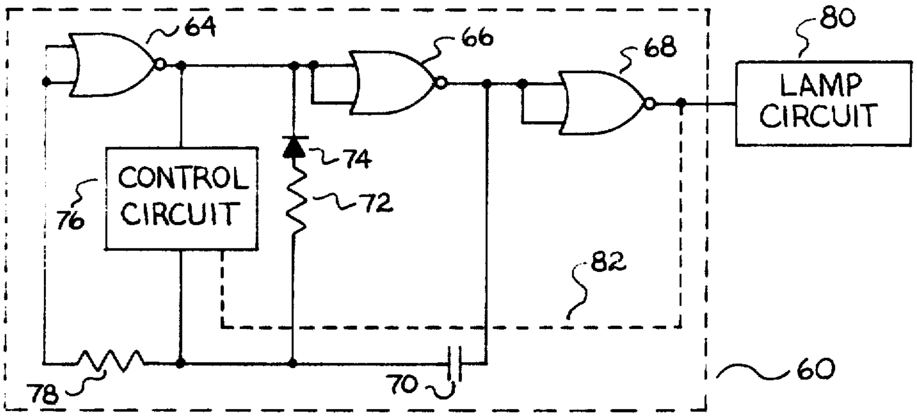
FIG. 5 is another illustrative embodiment of the present invention.

FIG. 5 shows an embodiment of an oscillator 60 in which output pulses are generated at all times but the frequency of the output pulses depends upon the condition of some environmental parameter to be sensed. This contrasts with the FIG. 1 and 4 embodiments in which output pulses were either generated or not generated depending upon the condition of the environmental parameter.

The oscillator 60 of FIG. 5 includes a NOR gate inverter 64 whose output is coupled to the input of another NOR gate inverter 66. The output of the inverter 66 is coupled by way of a feedback circuit to the inputs and output of the inverter 64 and thus necessarily to the inputs of the inverter 66. The feedback circuit includes a capacitor 70, a resistor 72 and a diode 74 coupled in series between the output of the inverter 66 and the inputs thereof. A control circuit 76 is coupled in parallel with the resistor 72 and diode 74. A resistor 78 couples the junction of the resistor 72 and capacitor 70 to the inputs of the inverter 64. The output of the inverter 66 is connected to two input terminals of a NOR gate inverter 68 whose output is connected to a lamp circuit 80. The dotted line connection 82 between the control circuit 76 and the output of the inverter 68 is an optional connection depending upon the type of control circuit 76 used. Specifically, when the circuit shown in FIG. 6A is utilized as the control circuit 76, the connection 82 is not needed, but when the circuit of FIG. 6B is used as the control circuit 76, the connection 82 is required.

The operation of the oscillator 60 of FIG. 5 is substantially the same as that for oscillator 10 of FIG. 1 during the time the sensing device 30 (FIG. 1) is presenting a low input to the NOR gate 16. Thus, in FIG. 5, when the output of the inverter 66 is high, capacitor 70 is initially charged positive and commences to discharge via the resistor 72 and diode 74. When the voltage at the input of the inverter 64 passes through the transfer voltage point of the inverter, the output of the inverter becomes high causing the inverter 66 to generate a low output. The capacitor 70 then is charged negative and a charge path for the capacitor 70 is provided via the control circuit 76. The time required to charge the capacitor 70 during this portion of the cycle is determined by the impedance presented by the control circuit 76. As the impedance of the control circuit 76 increases, the charge rate of the capacitor 70 is decreased and as the impedance of control circuit 70 decreases, the charge rate is increased. Recall that while the capacitor 70 is charging toward the transfer voltage point of the inverter 64, the output of the inverter 68 is high so that the lamp circuit 80 is not turned on. Thus, controlling the charge rate of the capacitor 70 controls the length of time between the flashing of the lamp circuit 80, i.e., the flash rate of the lamp circuit 80. Either circuit of FIGS. 3A and 3B could be utilized as the lamp circuit 80 of FIG. 5. Of course, other lamp circuits could also be utilized.

Figure 6A:
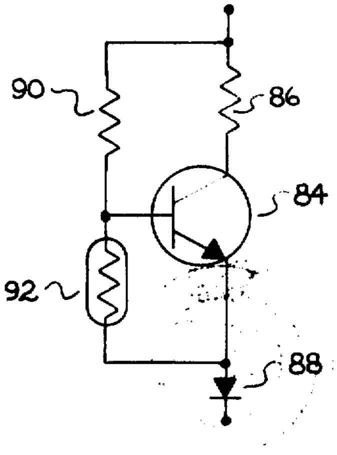
FIGS. 6A and 6B are illustrative embodiments of the control circuit of FIG. 5.
Figure 6B:
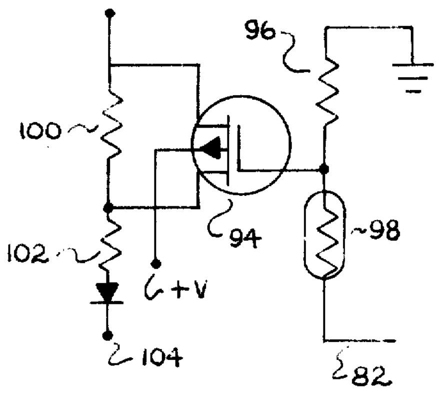

The FIG. 6A embodiment of the control circuit 76 includes an NPN type transistor 84 whose emitter-collector circuit is connected in series with a resistor 86 and a diode 88 and this series connection is coupled between the output of the inverter 64 and the junction of the resistor 78 and capacitor 70 of FIg. 5. A resistor 90 and environmental parameter sensing device 92 are coupled in series with each other and in parallel with the emitter-collector circuit of the transistor 84 and the resistor 86. The base of the transistor 84 is connected to the junction between the resistor 90 and the sensing device 92.

The resistance of the resistor 90 is selected to be considerably greater than the resistance of the resistor 86. Two current paths having considerably different impedances are thus provided by the FIG. 6A circuit. One current path consists of the resistor 90 and the sensing device 92 and the other current path consists of a resistor 86 and the transistor 84.

When the resistance of the sensing device 92 is high (such as, for example, if the sensing device 92 were a photocell and the light level were low), the voltage at the base of the transistor 84 is also high turning on the transistor 84 and enabling it to conduct current through the low resistance path of the resistor 86, the transistor 84 and the diode 88. With this low resistance path, the capacitor 70 would charge at a faster rate to correspondingly increase the flash rate of the lamp circuit 80 as previously described.

When the resistance of the sensing device 92 is low (such as, for example, if the sensing device 92 were a photocell and the light level were high), then the voltage at the base of the transistor 84 is also low so that the transistor is turned off preventing current flow via the resistor 86 and transistor 84. The current must then flow via the path having the higher impedance consisting of the resistor 90, sensing device 92 and diode 88. With this higher impedance path, the capacitor 70 charges at a slower rate and the flash rate of the lamp circuit is reduced correspondingly.

Application of the FIG. 5 circuit to roadside warning lamp systems is apparent. During the daytime, it may be desirable to provide a very slow lamp flash rate so as to use very little battery current but yet enable simple visual checking of the lamp system to determine if they are operating properly. Then, during nighttime hours, it would be desirable to provide a faster lamp flash rate to provide a readily-seen visual warning. The circuit of FIGS. 5 and 6A provide an arrangement in which the lamp flash rate is automatically controlled in accordance with the light level in a simple, reliable and efficient manner.

FIG. 6B shows an alternative embodiment for the control circuit 76 of FIG. 5. This embodiment includes a MOS FET (Metal Oxide Semiconductor, Field Effect Transistor) 94 whose gate electrode is connected to the junction of a resistor 96 and a sensing device 98. The sensing device 98 is connected via a lead 82 to the output of the inverter 68 of FIG. 5. The resistor 96 is also connected to ground potential. The substrate electrode of the MOS FET 94 is connected to a positive voltage source (battery) and the drain and source electrodes of the MOS FET 94 are coupled in parallel with a resistor 100. The resistor 100 is connected in series with a resistor 102 and a diode 104 and this series connection is coupled between the output of the inverter 64 and the junction of the resistor 78 and the capacitor 70 of FIG. 5.

The resistance of the resistor 100 would generally be considerably greater than the resistance of the resistor 102 to thereby provide a high resistance path composed of the resistors 100 and 102 and the diode 104, and a low resistance path composed of the MOS FET 94, the resistor 102 and the diode 104.

When the resistance of the sensing device 98 is high, the voltage at the gate of the MOS FET 94 is low so that the MOS FET is turned on shunting the resistor 100 to provide a low resistance path. When the resistance of the sensing device 98 is low, the voltage at the gate of the MOS FET 94 is high so that the MOS FET is turned off placing the resistor 100 in the current path. In this manner, depending upon the condition of the sensing device 98, either a low impedance or a high impedance path is presented by the control circuit 76 for charging the capacitor 70.

It is to be understood that the above-described embodiments are only illustrative of the principles of the present invention. Other embodiments may be devised by those skilled in the art without departing from the spirit and scope of the invention, and it is intended that the appended claims cover such embodiments. For example, although NOR gate inverters and NAND gate inverters have been shown in the present embodiments, other type inverters could also be used to provide the necessary inverting function. Furthermore, although the environmental sensing devices utilized in the present embodiments have been described as being either photocells or thermistors, it is apparent that other sensing devices for sensing other environmental parameters such as humidity, radioactivity, etc. could be utilized to vary the output of the oscillator circuits.

What is claimed is:

1. An environmental parameter responsive oscillator for producing output pulses having either of two frequencies depending upon the condition of an environmental parameter to be sensed comprising a first inverter;

a second inverter whose input is coupled to the output of said first inverter;

feedback means coupling the output of said second inverter to the input and output of said first inverter, said feedback means including capacitance means and first resistance means coupled in series between the output of said second inverter and the output of said first inverter; and control means coupled in parallel with said first resistance means for presenting either of two impedances depending upon the condition of an environmental parameter to thereby cause the oscillator to produce output pulses having either of two frequencies, said control means including a second resistance means, sensing means connected in series with said second resistance means for varying its resistance as a function of said environmental parameter, and a transistor whose base electrode is connected to the junction of the second resistance means and the sensing means and whose collector-emitter circuit is connected in parallel with the series connection of said second resistance means and said sensing means, said transistor assuming a conducting condition to present a low impedance path when the resistance of the sensing means is in a first range, and said transistor assuming a nonconducting condition so that said second resistance means and sensing means presents a higher impedance path when the resistance of the sensing means is in a second range.

2. The oscillator of claim 1 wherein said sensing means includes a photocell.

3. The oscillator of claim 1 wherein said sensing means includes a thermistor.

4. The oscillator of claim 1 further including a diode coupled in series with said first resistance means and wherein said control means further includes a diode coupled in series with the series connection of said second resistance means and said sensing means.

* * * * *